(12) United States Patent
Aoyama et al.

(10) Patent No.: US 11,102,372 B2
(45) Date of Patent: Aug. 24, 2021

(54) INFORMATION RECORDING BODY, MEDIUM AND PRINTED PRODUCT (71) Applicant: Dai Nippon Printing Co., Ltd., Tokyo (JP)

(72) Inventors: Yuko Aoyama, Tokyo (JP); Jun Sato, Tokyo (JP); Toshihisa Yamakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/647,140

(22) PCT Filed: Sep. 11, 2018

(86) PCT No.: PCT/JP2018/033673
§ 371 (c)(1),
(2) Date: Mar. 13, 2020

(87) PCT Pub. No.: WO2019/054380
PCT Pub. Date: Mar. 21, 2019

(65) Prior Publication Data
US 2021/0160397 A1 May 27, 2021

(30) Foreign Application Priority Data

Sep. 15, 2017 (JP) .............................. JP2017-177372

(51) Int. Cl.
*H04N 1/32* (2006.01)
(52) U.S. Cl.
CPC ................ *H04N 1/32149* (2013.01)
(58) Field of Classification Search
CPC ........................ H04N 1/32149; H04N 1/32144
See application file for complete search history.

(56) References Cited

U.S. PATENT DOCUMENTS 5,873,604 A * 2/1999 Phillips .................... B41M 3/14
283/70
2004/0233463 A1 11/2004 Hersch et al.
(Continued)

FOREIGN PATENT DOCUMENTS

EP 1014318 A2 6/2000
JP 2000-182086 A 6/2000
(Continued)

OTHER PUBLICATIONS

International Search Report dated Nov. 20, 2018, issued for PCT/JP2018/033673.
(Continued)

*Primary Examiner* — Christopher Wait
(74) *Attorney, Agent, or Firm* — Locke Lord LLP (57) ABSTRACT

The objective of the present invention is to provide an information recording body, a medium and a printed product having improved design properties. An information recording body provided with a superimposed image including a brilliant layer and a transparent layer formed on the brilliant layer is characterized in that: the brilliant layer is a chromatic color image formed from a brilliant material; the transparent layer is a regular pattern image formed from a transparent starting material; the transparent starting material is configured in such a way that an amount of light reflected therefrom differs depending on an observation angle; and the superimposed image is formed in such a way that the transparent layer is recognizable in accordance with a specific observation angle.

11 Claims, 11 Drawing Sheets

(56) References Cited

U.S. PATENT DOCUMENTS

| 2007/0082723 | A1 | 4/2007 | Ohashi et al. |
| 2008/0085775 | A1 | 4/2008 | Kasai et al. |
| 2017/0085753 | A1 | 3/2017 | Takahira et al. |
| 2017/0316304 | A1 | 11/2017 | Aoyama et al. |

FOREIGN PATENT DOCUMENTS

| JP | 2001-121804 A | 5/2001 |
| JP | 2005-014300 A | 1/2005 |
| JP | 2005-168742 A | 6/2005 |
| JP | 2008-188973 A | 8/2008 |
| JP | 2009-113223 A | 5/2009 |
| JP | 2010-100020 A | 5/2010 |
| JP | 2013-111781 A | 6/2013 |
| JP | 2016-093895 A | 5/2016 |
| JP | 2017-060090 A | 3/2017 |
| WO | 05/115575 A1 | 12/2005 |

OTHER PUBLICATIONS

Extended European Search Report issued in the EP Patent Application No. 18855488.5, dated Jun. 9, 2021.

* cited by examiner

INFORMATION RECORDING BODY, MEDIUM AND PRINTED PRODUCT

TECHNICAL FIELD

The present invention relates to an information recording object, a medium, and a printed product.

BACKGROUND ART

A digital watermarking technique of embedding specific information in an image or the like is known in the related art. When this technique is used for printed matters, information can be embedded at a level at which the information cannot be visually recognized by a person, and thus artistic effects of the printed matters are not damaged. In addition, information embedded in the printed matters can be read by a reading device.

When the embedded information is used for, for example, authenticity determination, it is preferable that the embedded information be difficult to be estimated from a copy. For this reason, a technique relating to an information recording object which is devised to make it difficult to estimate embedded information is disclosed (for example, Patent Document 1).

Patent Document 1: Japanese Unexamined Patent Application, Publication No. 2016-93895

DISCLOSURE OF THE INVENTION

Problems to be Solved by the Invention

In the technique described in Patent Document 1, both a first layer and a second layer are pattern images, and lack design properties.

An object of the invention is to provide an information recording object, a medium, and a printed product improving the design properties.

Means for Solving the Problems

The invention achieves the above-mentioned object using the following solving means.

A first invention is an information recording object including a superimposed image including a first ink layer and a second ink layer formed on the first ink layer, in which the first ink layer is an image of a chromatic color formed using a lustrous material, the second ink layer is a pattern image which is formed using a transparent material and has regularity, the transparent material is configured so that an amount of reflected light varies depending on a viewing angle, and the superimposed image is formed so that the second ink layer is allowed to be recognized by a specific viewing angle.

According to this configuration, it is possible to change a degree of glossiness for each color using a chromatic lustrous material. In this case of being viewed by human eyes, it is possible to obtain an information recording object in which the degree of glossiness is varied. Further, it becomes difficult to adjust the density and the like in the copying machine. Therefore, it is possible to obtain an information recording object which is rich in design properties and is more difficult to copy. Further, it is possible to provide an information recording object having rich design properties and a mechanism that does not allow information to be recognized when a reading device is not used.

A second invention is the information recording object according to the first invention, in which the first ink layer includes a shading pattern image patterned by shading of colors.

When the shading pattern image is included, color density and contrast cannot be discerned by human eyes, which can hinder copy.

A third invention is the information recording object according to the first invention, in which the first ink layer is formed by a plurality of colors, and at least one color is formed using the lustrous material.

By using a plurality of colors of metallic ink, it is difficult to adjust the color in the copying machine, and it is difficult to produce a copied product similar to a real product.

A fourth invention is the information recording object according to the first invention, in which each of the plurality of colors formed by the lustrous material is different in material and content of the lustrous material.

A fifth invention is the information recording object according to the first invention, in which the first ink layer includes a picture image and a background image.

A sixth invention is the information recording object according to the fifth invention, in which the background image is a shading pattern image patterned by shading of colors.

A seventh invention is the information recording object according to the first invention, in which the second ink layer is read by a reading unit of an external device and subjected to a converting process corresponding to the regularity, so that data corresponding to a code is generated.

An eighth invention is a medium including the information recording object according to the first invention.

A ninth invention is a printed product including the information recording object according to the first invention.

Effects of the Invention

According to the invention, it is possible to provide an information recording object, a medium, and a printed product improving the design properties.

PREFERRED MODE FOR CARRYING OUT THE INVENTION

Hereinafter, a mode for carrying out the invention will be described with reference to the drawings. The mode is only an example and the technical scope of the invention is not limited to the mode.

Embodiment

Figure 1A:
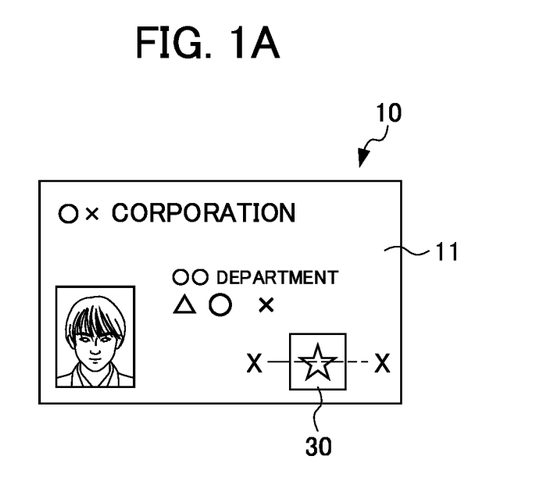
FIG. 1(A) and FIG. 1(B) are diagrams illustrating a card according to an embodiment.
Figure 1B:
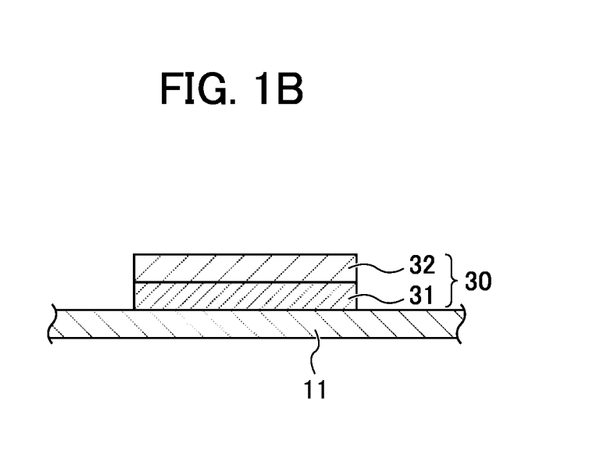

FIG. 1(A) and FIG. 1(B) are diagrams illustrating a card 10 according to an embodiment.
<Card 10>
A card 10 (medium) illustrated in FIG. 1A is, for example, an ID card such as an employee card. The card 10 includes a base 11 and an information recording object 30. The base 11 is a substrate that is the basis of the card 10, and is formed with, for example, a plastic card. Note that the base 11 is not limited to the plastic card, and may be other bases such as white paper, high-quality paper, coated paper, tack paper, and a film as long as the base 11 has a plane capable of carrying a printed image. In this example, the printed image relates to content of an employee, such as a name, a face image, and affiliation of the employee.
<Structure of Information Recording Object 30>
For example, the information recording object 30 representing a logo is disposed on the surface side of the base 11. On the information recording object 30, for example, information which is used for authenticity determination such as a code is printed by latent image printing. An image printed on the information recording object 30 is changed by changing the viewing direction of the base 11. FIG. 1B is a partial schematic cross-sectional view taken along the line X-X in FIG. 1A. As illustrated in FIG. 1B, the information recording object 30 includes a lustrous layer 31 (first ink layer) and a transparent layer 32 (second ink layer) on the base 11. The lustrous layer 31 is a layer on which a background image and a picture image are printed with a chromatic ink containing a lustrous material. The transparent layer 32 is a layer on which a pattern image is printed with a transparent achromatic ink. In this example, both the lustrous layer 31 and the transparent layer 32 have a square shape, and the transparent layer 32 is formed on the entire lustrous layer 31.

Herein, a method for manufacturing the information recording object 30 will be described in brief. First, a base 11 on which details (name, etc.) of the corresponding employee have been printed in advance is prepared, and the background image and the picture image are gravure-printed on the base 11 as the lustrous layer 31 with a lustrous ink, etc. containing a lustrous material. As ink for drawing the background image and the picture image, for example, various types of inks are presumed as illustrated below. For example, it is possible to use ink obtained by mixing a chromatic ink of pigmented coloring containing a pigment and a dye with a silver ink containing aluminum powder, copper powder, zinc powder, tin powder, iron phosphide, etc. as a component. In addition, it is possible to use ink containing only a lustrous material exhibiting a blue gold color or a red gold color. Further, it is possible to use ink obtained by mixing a chromatic ink of the pigmented coloring described above with the ink containing the lustrous material exhibiting the blue gold color or the red gold color. In addition, it is possible to use pearl ink, liquid crystal ink, optical variable ink (OVI), color shifting ink (CSI), etc., which is ink containing a functional pigment whose color changes by reflecting light. Note that the pearl ink has a pearl luster as compared with a normal pigment, and is ink containing a pearl pigment having safety, glossiness, and high-grade feeling. The liquid crystal ink is ink containing liquid crystal having a property of changing color with temperature. Furthermore, when the substrate has a high degree of smoothness, normal ink can be used to look like glossy ink. When the substrate has a high degree of smoothness, a slight glossiness is produced even in a non-lustrous yellow color, light blue color, etc. by normal color inks (yellow (Y), magenta (M), cyan (C), and black (K)). For this reason, normal color ink can be used as ink similar to a lustrous material. For example, in a case where the substrate is paper, when coated paper, matte-coated paper, gloss-coated paper, etc. is used, normal color ink can be used since a degree of smoothness is high. Further, even when the substrate is a film such as PET, normal color ink can be used.

Next, a pattern image is superimposed and gravure-printed as the transparent layer 32 on the background image and the picture image of the lustrous layer 31 with a transparent ink or the like. The ink which is used to draw the pattern image is, for example, achromatic ink such as a matte OP varnish, a transparent varnish, an ink varnish, a transparent ink, or a medium ink. In addition, these inks may be any printing ink such as a UV-curable type ink, an oxidation-polymerization type ink, a permeation type ink, an overheat-drying type ink, and a vaporization-drying type ink. In addition, even when achromatic color is not used, chromatic transparent ink can be used. In this case, a small amount of normal color ink is mixed with the achromatic transparent ink to obtain chromatic transparent ink.

Herein, the thickness of the ink to be applied is, for example, about 1 micrometer. In addition, the thickness of the ink is not limited thereto. In addition, for example, the thickness of the ink may be changed depending on the material. The printing process described above is not limited to gravure printing, but may be wet offset printing, dry offset printing, relief printing, waterless lithographic printing, flexographic printing, screen printing, intaglio printing, or the like.

Figure 2:
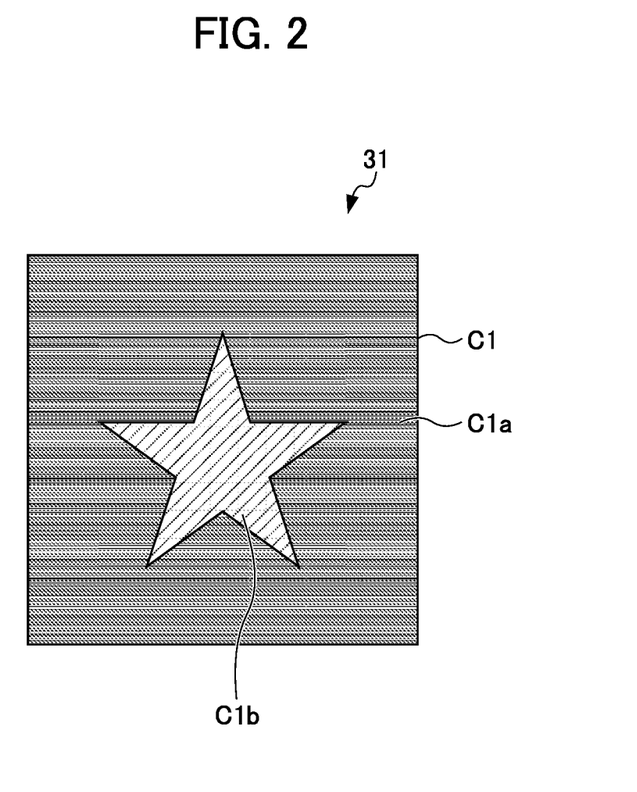
FIG. 2 is a diagram illustrating an example of a background image and a star image of a lustrous layer according to the embodiment.
Figure 3A:
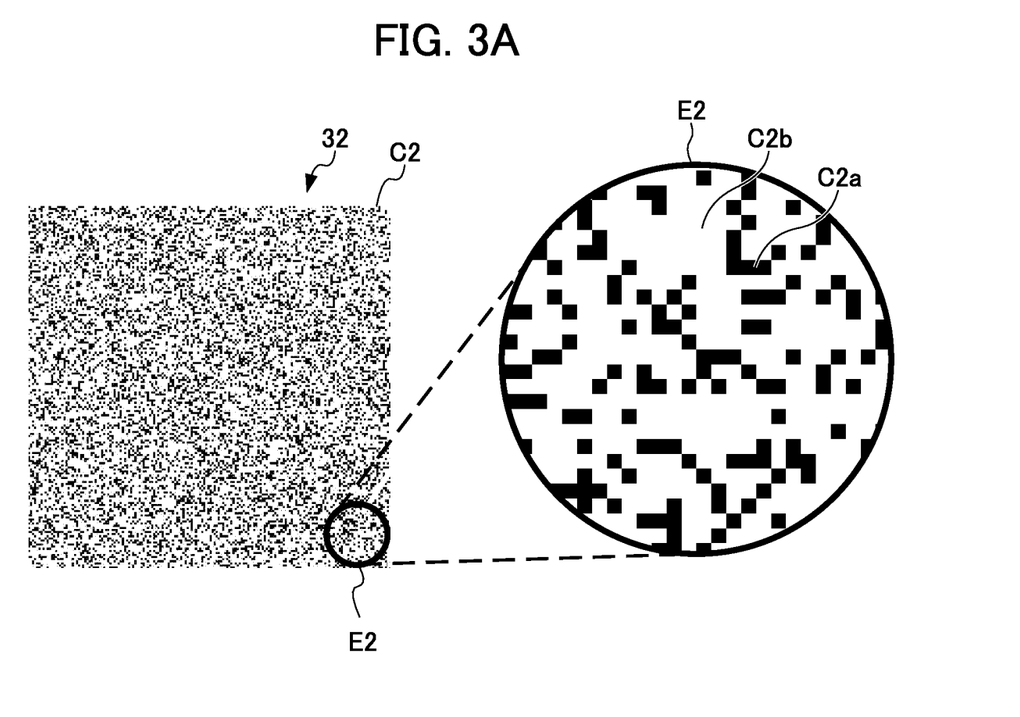
FIG. 3(A) and FIG. 3(B) are diagrams illustrating an example of a pattern image of a transparent layer according to the embodiment.
Figure 3B:
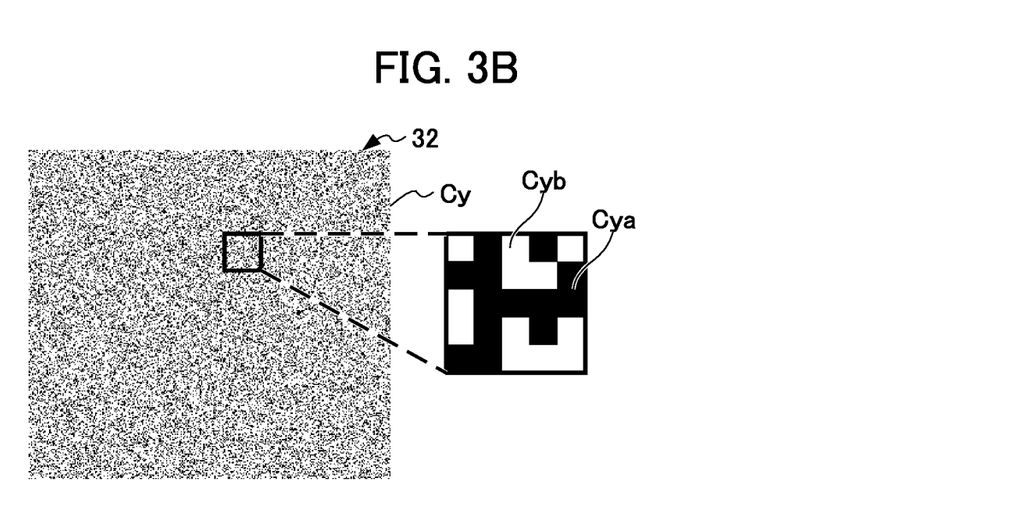
Figure 4:
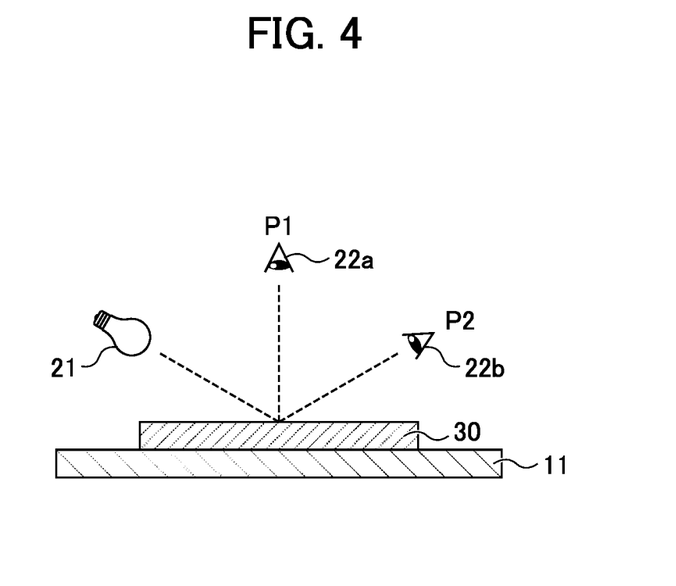
FIG. 4 is a diagram illustrating a viewing mode based on a structure of the information recording object according to the embodiment.

Next, the printing of the lustrous layer 31 and the transparent layer 32 in a printing region with a fixed area which is printed through the printing process of the information recording object 30 will be described with the printing condition in which an area covering a bed represented by % is defined as an area ratio, and particularly, the printing condition in which the bed can be hidden by halftone is defined as a halftone area ratio. FIG. 2 is a diagram illustrating an example of a background image C1a and a star image C1b of a lustrous layer 31 according to the embodiment. FIG. 3(A) and FIG. 3(B) are diagrams illustrating an example of a pattern image of the transparent layer 32 according to the embodiment. FIG. 4 is a diagram illustrating a viewing mode based on the structure of the information recording object 30 according to the embodiment.

FIG. 2 illustrates an example of an image C1 of the lustrous layer 31. The lustrous layer 31 is a layer on which the image C1 is printed by replacing each of the gravure-printed cyan-magenta-yellow-black (CMYK) inks with metallic ink. Here, black (K) is added to the three colors of yellow (Y), magenta (M), and cyan (C) and these four colors are combined into a set, and each color is overprinted to express multiple colors. C replaces the metallic blue color, M replaces the metallic red color, Y replaces the metallic yellow color, and K replaces the silver color with the CMYK ink. Here, it is unnecessary to use the same lustrous material for each color, and different lustrous materials may be used. Further, the content of the lustrous material may be different for each color.

By using different lustrous materials for each color and varying the content, a degree of glossiness of each color changes. Therefore, the degree of glossiness can be varied in appearance. In addition, it is difficult to adjust the density and the like in the copying machine, and it is possible to make copying more difficult.

The image C1 includes the background image C1a and the star image C1b (picture image). The background image C1a is a pattern image that is patterned by shading of colors. The pattern image of the background image C1a is subjected to regular processing such that the color density, contrast, and the like may not be recognized by human eyes. The star image C1b is a star-shaped image. Since the star image C1b is not a pattern image, a star-shaped pattern can be clearly seen. The background image C1a and the star image C1b may have the same color or different colors.

The background image C1a is printed with a halftone area ratio of, for example, 100%. Further, the star image C1b is printed with a halftone area ratio of, for example, 75%. However, this ratio is also an example, but the invention is not limited thereto. For example, the halftone area ratio of the background image C1a may be less than 100%, and the halftone area ratio of the star image C1b may be equal to or greater than or equal to or less than 25% as long as there is a predetermined difference from the background image C1a. In addition, the densities of the background image C1a and the star image C1b may be reversed. In the example illustrated in FIG. 2, as an example of the image C1 illustrated in the lustrous layer 31, the background image C1a and the star image C1b are printed using the present technology. As described above, since the metallic ink is used, the print of the image C1 is glossy. In addition, since the printing is performed using a plurality of chromatic colors, the printed image becomes vivid in appearance and rich in design properties.

FIG. 3A illustrates an enlarged view of an image C2 of the transparent layer 32 and a region E2 which is a portion of the image C2. The transparent layer 32 is a layer on which the image C2 is printed. The image C2 is a pattern image in which a foreground portion C2a and a background portion C2b are expressed in two values as illustrated in the region E2. The pattern image of the image C2 has a different coding system from the pattern image of the background image C1a described above. Details of the pattern image of the image C2 will be described later.

The foreground portion C2a is printed with a halftone area ratio of, for example, 100%, and the background portion C2b is printed with a halftone area ratio of, for example, 25%. However, this ratio is an example, but the invention is not limited thereto. For example, the halftone area ratio of the foreground portion C2a may be less than 100%, and the halftone area ratio of the background portion C2b may be equal to or greater than or equal to or less than 25% as long as there is a predetermined difference from the foreground portion C2a. In addition, the densities of the foreground portion C2a and the background portion C2b may be reversed. The image C2 of the transparent layer 32 of the information recording object 30 is a pattern image, and thus the image is a meaningless image at first glance.

Herein, the transparent layer 32 of the information recording object 30 is not limited to that on which a pattern image including a foreground portion and a background portion is printed. FIG. 3B illustrate a case in which an image Cy of the transparent layer 32 is a pattern image configured to include only the foreground portion. In this case, a printing region Cya of the image Cy is printed with a halftone area ratio of 100%, and the pattern image is expressed in two values by using the printing region Cya and the non-printing region Cyb, which is not printed.

Next, a description will be given of the pattern image of the transparent layer 32 illustrated in FIGS. 3(A) and 3(B). The pattern image is an image generated according to a specific rule. The pattern image can represent feature points and lines in a spatial frequency domain that is frequency-converted by performing, for example, Fourier transform. For example, a feature point can be expressed by performing the converting process on the image C2 (or the image Cy). Herein, the specific rule is not limited to the Fourier transform and may be another transform process. For example, a converting process for a barcode, a converting process for a two-dimensional code such as a QR code (registered trademark), or the like may be used.

In the information recording object 30 described above, a recognizable image varies depending on an angle of viewpoint (a viewing angle) in a reading device 5 (external device) described later. FIG. 4 illustrates three positional relationships among an illumination light source 21, a viewpoint 22, and an information recording object 30 in a diffusible reflection region and a regular reflection (specular reflection) region. When the viewpoint 22 (22a) is located at a position P1 with respect to the positions of the illumination light source 21 and the information recording object 30, the object is viewed in the diffusible reflection region. In addition, when the viewpoint 22 (22b) is located at the position P2 with respect to the positions of the illumination light source 21 and the information recording object 30, the object is viewed in the regular reflection region. Hereinafter, the image C1 and the image C2 illustrated in FIGS. 2 and 3(A) will be described as an example.

When the information recording object 30 includes only the lustrous layer 31, since a large difference is caused in reflected light quantity in the diffusible reflection region due to the density difference between the background image C1a and the star image C1b of the image C1 in FIG. 2, the background image C1a and the star image C1b can be distinguished, and the star image C1b can be recognized. On the other hand, in the regular reflection region, since the reflected light quantities of both the background image C1a and the star image C1b increase, the difference therebetween cannot be detected, and the background image C1a and the star image C1b cannot be distinguished. That is, in the regular reflection region, the star image C1b cannot be recognized. As described above, in the lustrous layer 31, when ink of the lustrous material is used, the star image C1b may be visible or invisible depending on the viewing angle and thus can render various presentation modes.

Next, when the information recording object 30 includes only the transparent layer 32, the foreground portion C2a and the background portion C2b of FIG. 3A are transparent, and thus cannot be distinguished in the diffusible reflection region. On the other hand, in the regular reflection region, since the reflected light quantities vary due to the density difference between the foreground portion C2a and the background portion C2b, the foreground portion C2a and the background portion C2b can be distinguished. In this manner, the transparent layer 32 is formed by using materials (such as inks) having different reflected light quantities depending on the viewing angle, so that the image of the transparent layer 32 may be visible or invisible depending on the viewing angle and thus can render various presentation modes.

Further, in a case where the information recording object 30 is obtained by forming the transparent layer 32 on the lustrous layer 31, the image C1 can be distinguished and the foreground portion C2a and the background portion C2b cannot be distinguished in the diffusible reflection region, and thus the image C1 is observed as a whole. In addition, in the regular reflection region, the image C1 cannot be distinguished, and the foreground portion C2a and the background portion C2b can be distinguished. For this reason, in the information recording object 30, the image of the lustrous layer 31 and the image of the transparent layer 32 may be visible or invisible depending on the viewing angle and thus can render various presentation modes.

<Copying of Card 10>

Figure 5A:
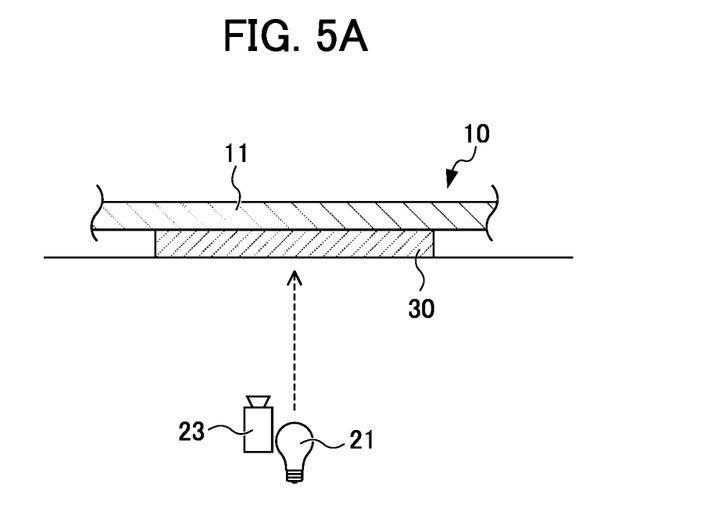
FIG. 5(A) and FIG. 5(B) are diagrams a positional relationship between an illumination light source and a camera when copying a card according to the embodiment.
Figure 5B:
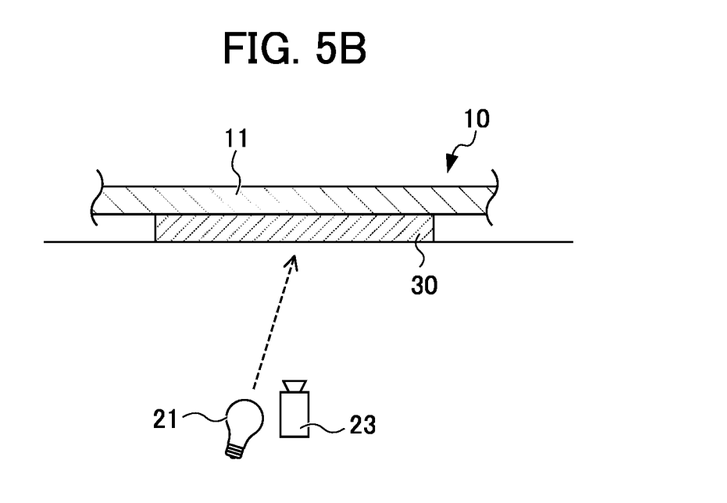

Next, a case in which the card 10 is copied will be described. FIG. 5(A) and FIG. 5(B) are diagrams illustrating a positional relationship between the illumination light source 21 and the camera 23 at the time of copying the card 10 according to the embodiment. FIGS. 5(A) and 5(B) illustrate the positional relationship among the illumination light source 21, the camera 23, and the card 10 of a copying machine such as a copier. In the state where the information recording object 30 of the card 10 is irradiated with light from the illumination light source 21 illustrated in FIG. 5A or 5B, an image thereof is acquired by the camera 23.

FIG. 5A illustrates a case in which the illumination light source 21 and the camera 23 are located in the direction perpendicular to the information recording object 30 and the camera 23 acquires an image. FIG. 5B illustrates a case in which the illumination light source 21 irradiates the information recording object 30 from a direction slightly inclined thereto and the camera 23 captures an image of the information recording object 30 in the direction perpendicular thereto to acquire an image. In any case, the camera 23 captures images of both the lustrous layer 31 and the transparent layer 32 of the information recording object 30 depending on the positional relationship between the illumination light source 21 and the information recording object 30. In the copying machine, a copied product of the card 10 is produced on the basis of the image obtained by the camera 23 in this manner.

The copied product includes a printed object at a position corresponding to the information recording object 30 (see FIG. 1A) of the card 10. The printed object has a combined image of the image of the lustrous layer 31 and the pattern image of the transparent layer 32 of the information recording object 30. Accordingly, even when the printed object is observed at a viewing angle in any region (such as the diffusible reflection region or the regular reflection region), only the combined image is viewed in the printed object. Therefore, in the printed object, only the pattern image of the transparent layer 32 cannot be observed.

In addition, when the card 10 is printed in monochrome, the printed object has a layer made of black ink containing general carbon. On the other hand, when the card 10 is printed in color, the printed object has a layer made of general CMYK ink. On the other hand, as described above, the lustrous layer 31 of the information recording object 30 of the card 10 is manufactured using metallic ink. Therefore, in the copying machine, it is difficult to adjust the color represented by the metallic ink, and the printed object of the copied product has a different color from that of the information recording object 30 of the real card 10. In addition, it is difficult to copy transparent ink in the copying machine.

Therefore, the copied product can be recognized at a glance as being a fake by the difference in color.

<Reading Device 5>

Figure 6:
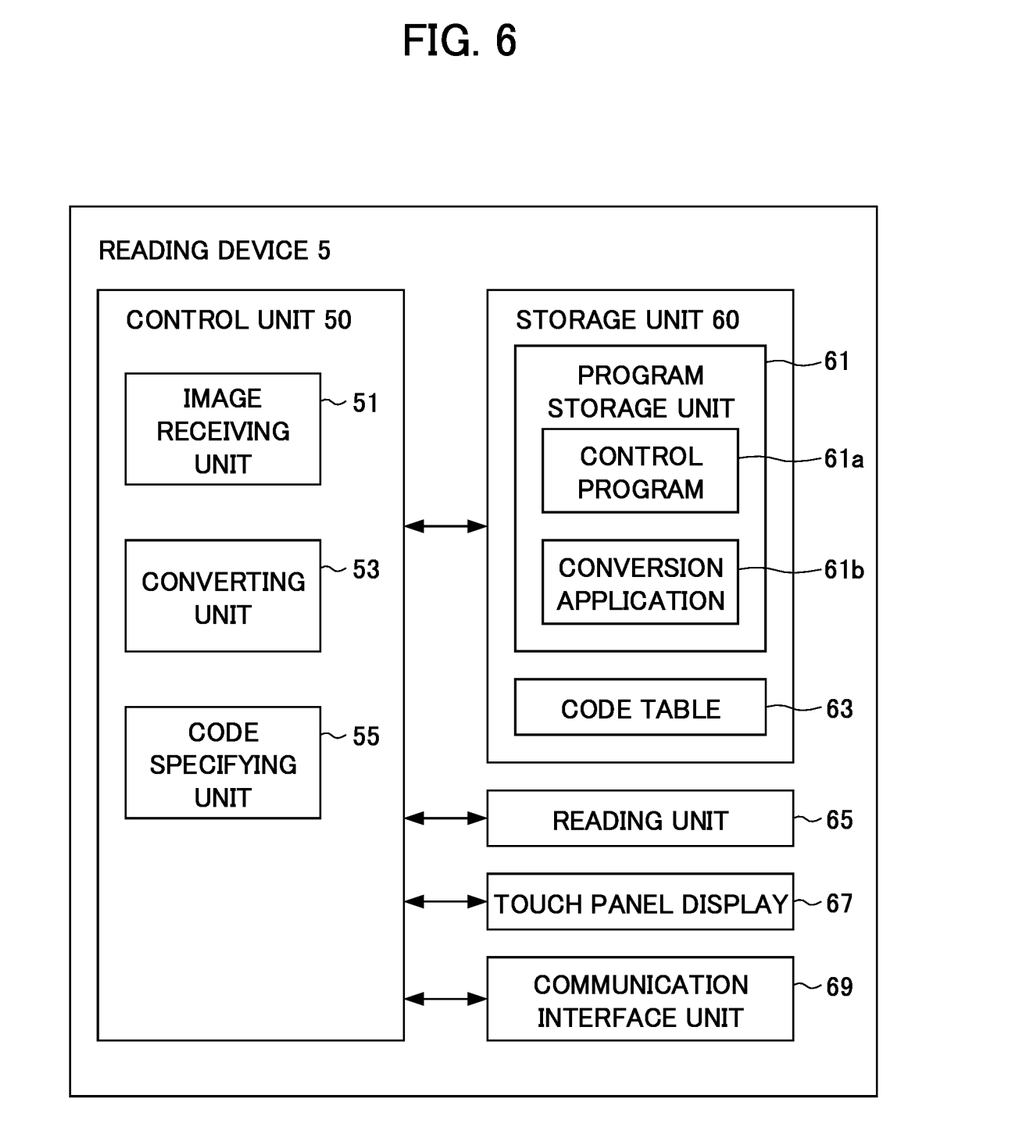
FIG. 6 is a functional block diagram of a reading device according to the embodiment.

Next, a reading device 5 (external device) that reads a code from the information recording object 30 of the card 10 will be described. FIG. 6 is a functional block diagram of the reading device 5 according to the embodiment. The reading device 5 is, for example, a mobile terminal represented by a smartphone. The reading device 5 includes a control unit 50, a storage unit 60, a reading unit 65, a touch panel display 67, and a communication interface unit 69. The control unit 50 is a central processing unit (CPU) that controls the reading device 5 as a whole. The control unit 50 implements various functions in cooperation with the above-mentioned hardware by appropriately reading and executing an operating system (OS) or an application program stored in the storage unit 60. The control unit 50 includes an image receiving unit 51, a converting unit 53, and a code specifying unit 55.

The image receiving unit 51 receives the image data of the information recording object 30 through the reading unit 65 when the reading unit 65 reads the information recording object 30. The converting unit 53 performs predetermined conversion on the image data received by the image receiving unit 51 by using a conversion application 61b described later and acquires data for code generation. The code specifying unit 55 specifies a code from the data acquired by the converting unit 53 with reference to a code table 63.

The storage unit 60 is a memory area of a hard disk, a semiconductor memory device, or the like for storing programs, data, and the like required for causing the control unit 50 to perform various processes. The computer refers to an information processing device including a control unit, a storage device, and the like, and the reading device 5 is an information processing device including the control unit 50, the storage unit 60, and the like and is included in the concept of a computer. The storage unit 60 stores the program storage unit 61 and the code table 63. The program storage unit 61 is a memory area for storing various programs. The program storage unit 61 stores the control program 61a and the conversion application 61b. The control program 61a is a program for executing each function of the control unit 50. The conversion application 61b is a dedicated application for reading a code, which is called from the control program 61a. The control program 61a and the conversion application 61b are stored in the program storage unit 61 via the communication interface unit 69, for example, by being downloaded from an application distribution server (not illustrated). The code table 63 is a table that stores codes.

The reading unit 65 is, for example, a camera and is a device that acquires printing details such as images and characters as images. The information recording object 30 of the card 10 is read by the reading unit 65 of the reading device 5. The touch panel display 67 has a function as a display unit configured with a liquid crystal panel or the like and a function as an input unit for detecting a touch input by a user's finger or the like. The communication interface unit 69 is an interface for performing communication with, for example, a distribution server described above.

<Process of Reading Device 5>

Figure 7:
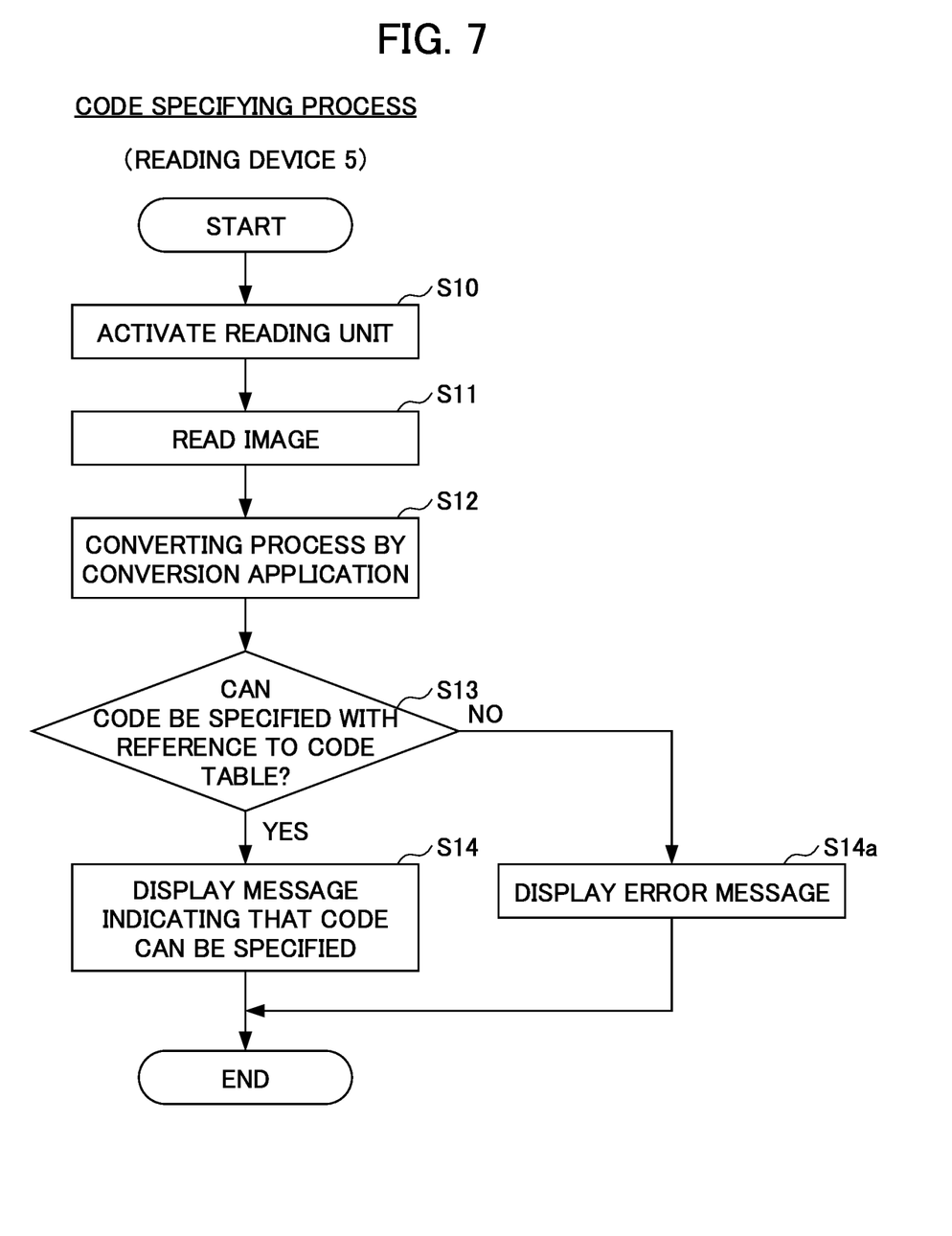
FIG. 7 is a flowchart illustrating a code specifying process in the reading device according to the embodiment.

A process of the reading device 5 will be described below. FIG. 7 is a flowchart illustrating a code specifying process in the reading device 5 according to the embodiment. In step S (hereinafter simply referred to as "S") 10, the control unit 50 of the reading device 5 activates the reading unit 65. In S11, the control unit 50 (the image receiving unit 51) reads an image on the information recording object 30 using the reading unit 65. Herein, a user can allow the reading unit 65 to read an image by setting a position of the reading unit 65 at an angle at which the pattern image of the transparent layer 32 of the information recording object 30 can be read. In addition, the user can allow the reading unit 65 to read an image by setting the position of the reading unit 65 at an angle at which the image of the lustrous layer 31 of the information recording object 30 can be read. Further, the user can allow the reading unit 65 to read an image by setting the position of the reading unit 65 at an angle at which the image of the lustrous layer 31 and the image of the transparent layer 32 of the information recording object 30 can be read. In the case of specifying code, in order to allow the reading unit 65 to read an image from an angle at which the pattern image of the transparent layer 32 can be read, for example, the user performs an operation for reading an image by specifying a regular reflection region where the transparent layer 32 is visible.

In S12, the control unit 50 (converting unit 53) executes the converting process on the read image and acquires the data for the code generation. Herein, the converting process is executed by the conversion application 61b. In S13, the control unit 50 (code specifying unit 55) determines whether or not a code corresponding to the acquired data can be specified with reference to the code table 63. When there is data that matches the acquired data in the code table 63, the code can be specified. When a code can be specified (S13: YES), the control unit 50 transfers the process to S14. On the other hand, when a code cannot be specified (S13: NO), the control unit 50 transfers the process to S14a. In S14, the control unit 50 displays a message indicating that the code can be specified on the touch panel display 67. Thereafter, the control unit 50 ends the process. In addition, after the process is ended, the control unit 50 performs a process based on the specified code. On the other hand, in S14a, the control unit 50 displays an error message on the touch panel display 67. Thereafter, the control unit 50 ends the process.

When the reading unit 65 reads an image from an angle at which the user can read only the pattern image of the transparent layer 32 using the reading device 5, the control unit 50 acquires only the pattern image of the transparent layer 32. Then, the control unit 50 executes the conversion application 61b (S12) to acquire data for specifying code. Herein, since the code corresponding to the pattern image of the transparent layer 32 is stored in the code table 63, the control unit 50 can specify the code (S13: YES).

In addition, when the reading unit 65 reads the image at an angle at which the user can read the pattern image of the transparent layer 32 and the image of the lustrous layer 31 using the reading device 5, the control unit 50 does not obtain only the pattern image of the transparent layer 32. However, the pattern image included in the image of the lustrous layer 31 has a different code system from that of the pattern image of the transparent layer 32. Therefore, when the conversion application 61b is executed (S12), the control unit 50 can acquire data for specifying code corresponding to the pattern image of the transparent layer 32. Since the code for the acquired data is stored in the code table 63, the control unit 50 can specify the code (S13: YES).

On the other hand, when the reading unit 65 reads the image from an angle at which the user can read only the image of the lustrous layer 31 using the reading device 5, the control unit 50 does not obtain the pattern image of the transparent layer 32. The code table 63 stores only the code corresponding to the pattern image of the transparent layer 32, and does not store the code corresponding to the image of the lustrous layer 31. Therefore, even when the control unit 50 acquires data for code generation by the control program 61a (S12), the control unit 50 cannot specify the code (S13: NO). Note that, even when the reading unit 65 reads an image from an angle at which only the image of the lustrous layer 31 can be read, the control unit 50 executes the conversion application 61b to perform a process of acquiring data for code generation (S12).

Figure 8A:
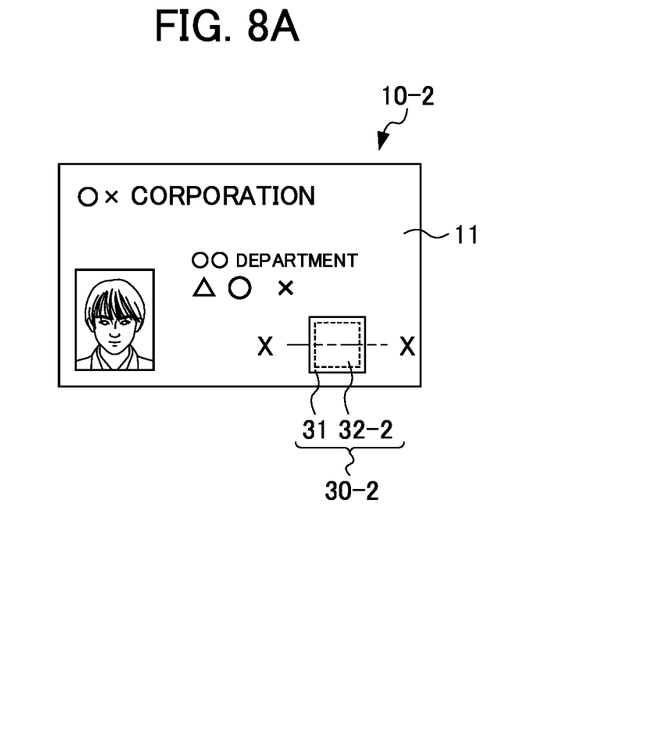
FIG. 8(A) and FIG. 8(B) are diagrams illustrating a specific example of another card according to the embodiment.
Figure 8B:
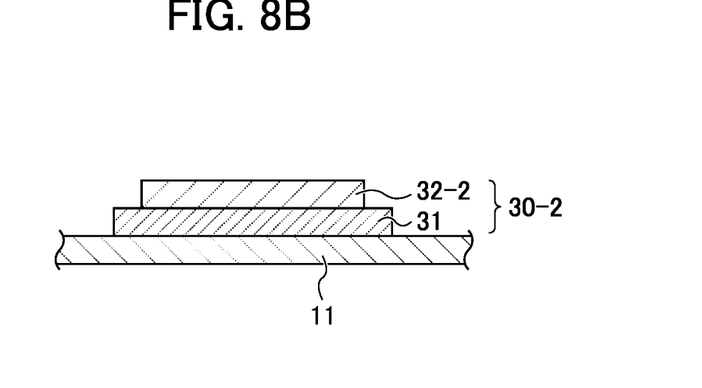

Next, a description will be given of another example of the information recording object 30. In addition, in the description, the same symbol is attached to an end of a portion performing the same function as that of the above-described information recording object 30, and overlapping description will be appropriately omitted. Further, a different configuration from that of the information recording object 30 will be described in detail. FIG. 8(A) to FIG. 10(C) are diagrams illustrating specific examples of another card 10 according to the present embodiment. FIG. 8A illustrates an example of a card 10-2. In the card 10-2, an information recording object 30-2 is configured by a lustrous layer 31 and a transparent layer 32-2 on a base 11. FIG. 8B is a partial schematic view of a cross section taken along line X-X in FIG. 8A. As illustrated FIG. 8B, the transparent layer 32-2 of the information recording object 30-2 is formed on a part of the lustrous layer 31. As described above, in the information recording object 30-2, the area where the lustrous layer 31 is formed and the area where the transparent layer 32-2 is formed do not coincide with each other in plan view, and are different in size. In this way, the state in which the lustrous layer 31 is observed and the state in which the transparent layer 32-2 is observed are more easily distinguished, and the angle at which the transparent layer 32-2 can be observed is visually easily understood. Note that FIG. 8(A) and FIG. 8(B) illustrates an example in which the lustrous layer 31 and the transparent layer 32-2 are different in only size. However, the invention is not limited thereto. The layers may have the same size and be shifted and disposed, or the shape of the transparent layer 32-2 may be different from the shape of the lustrous layer 31.

Figure 9A:
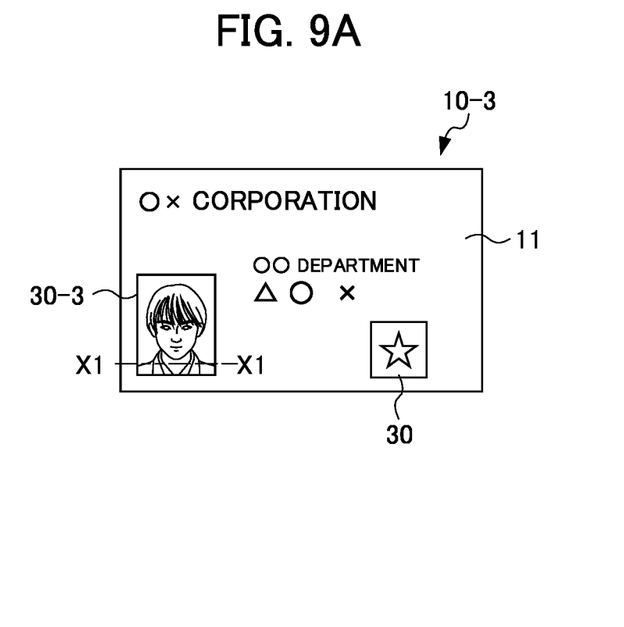
FIG. 9(A) and FIG. 9(B) are diagrams illustrating a specific example of another card according to the embodiment.
Figure 9B:
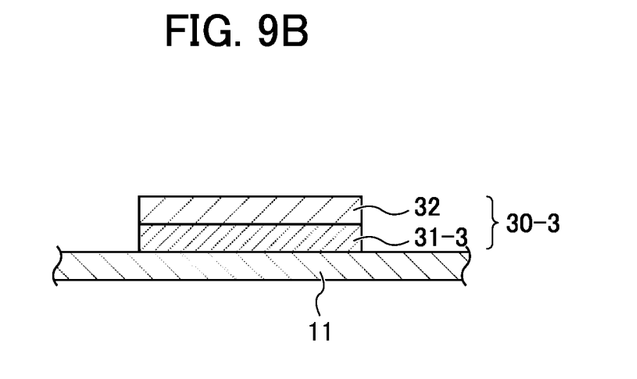

FIG. 9A illustrates an example of a card 10-3. The card 10-3 further includes a face photograph portion as an information recording object 30-3 in addition to the card 10 described above. FIG. 9B is a partial schematic cross-sectional view taken along the line X1-X1 in FIG. 9A. As illustrated in FIG. 9B, the information recording object 30-3 includes a lustrous layer 31-3 and a transparent layer 32 on a base 11 substantially similarly to the information recording object 30. The lustrous layer 31-3 includes a background image and a face image. Since the face image is not a pattern image, the face image can be clearly recognized. As described above, when the information recording object 30 and the information recording object 30-3 are provided, the association between the information recording object 30 and the information recording object 30-3 may be used in the processing in the reading device 5. For example, in the processing of the reading device 5, the control unit 50 (the image receiving unit 51) reads the information recording object 30 and the information recording object 30-3. Then, the control unit 50 (the converting unit 53) acquires data for code generation of both the information recording object 30 and the information recording object 30-3, and verifies coincidence of the two pieces of data. In a case where the two pieces of data coincide with each other, the control unit 50 may perform a process of specifying a code, for example, by determining that the card 10-3 is not forged but correct.

Figure 10A:
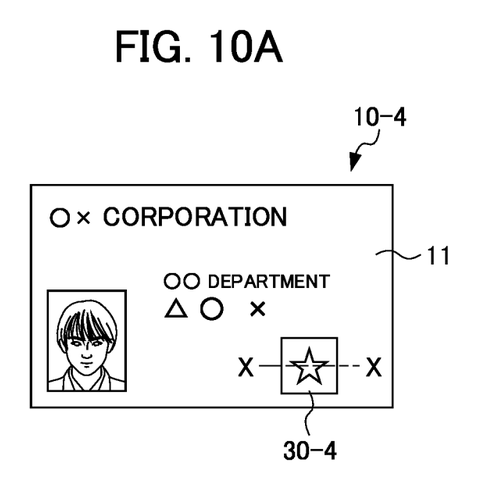
FIG. 10(A), FIG. 10(B) and FIG. 10(C) are diagrams illustrating a specific example of another card according to the embodiment.
Figure 10B:
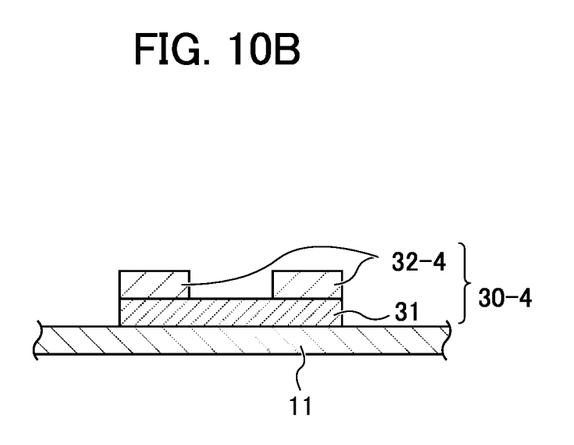
Figure 10C:
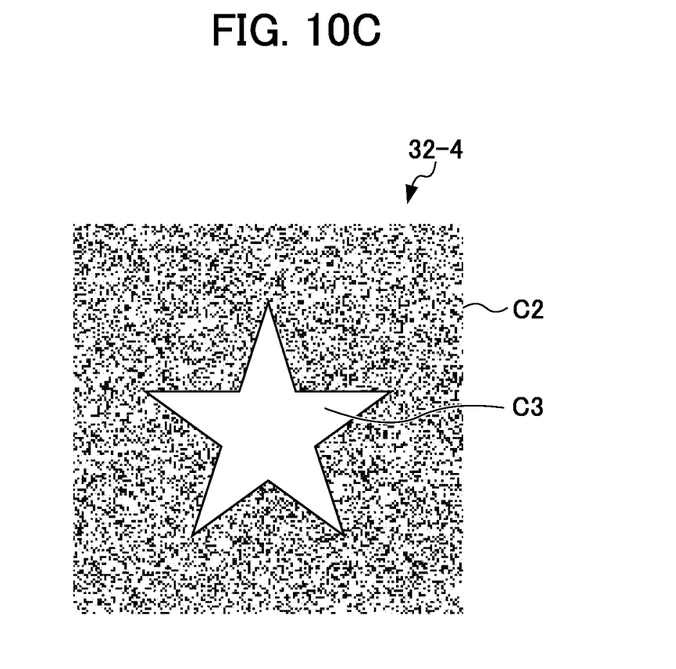

FIG. 10A illustrates an example of a card 10-4. The card 10-4 allows the star image to be seen more clearly than the card 10 described above. FIG. 10B is a partial schematic cross-sectional view taken along the line X-X in FIG. 10A. As illustrated in FIG. 10B, the information recording object 30-4 includes a lustrous layer 31 and a transparent layer 32-4 on a base 11. As illustrated in FIG. 10C, the transparent layer 32-4 does not have a pattern image of an image C2 since an area overlapping the star image of the lustrous layer 31 is not printed as an unprinted area C3. As described above, the information recording object 30-4 does not have the transparent layer 32-4 in the area of the lustrous layer 31 where the star image is printed, and thus the star image of the lustrous layer 31 is seen more clearly. At the same time, the region not overlapping with the star image can be made more difficult to duplicate by having the transparent layer 32-4.

Thus, according to the embodiment, the following effects are obtained.

(1) In the information recording object 30, since the lustrous layer 31 is a chromatic printing layer using a metallic ink, the information recording object 30 becomes colored and glossy, and the design properties are remarkably improved. Further, the image C2, which is a pattern image formed on the transparent layer 32 corresponding to a printing layer using transparent ink, can be made hard to visually recognize. Further, since the transparent layer 32 is disposed to overlap the lustrous layer 31, the transparent layer 32 can be made harder to visually recognize.

(2) Since the lustrous layer 31 is formed in a plurality of colors and the image C1 is configured to include the star image C1b and the background image C1a, the design properties can be further improved by the star image C1b. In addition, since the lustrous layer 31 uses a plurality of colors of metallic ink, it is difficult to adjust the color in the copying machine, and it is difficult to produce a copied product similar to the real product, thereby preventing forgery.

(3) Since the image C1 is included in the lustrous layer 31 and the image C2 is included in the transparent layer 32, the image C1 and the image C2 can be switched and observed depending on the viewing angle of the information recording object 30.

(4) In the transparent layer 32, which is a printing layer using transparent ink, the image C2, which is a pattern image, can be recognized in the regular reflection region. Therefore, when the image is read at a viewing angle at which the image C2 of the transparent layer 32 can be observed, the code can be read by a converting process.

(5) By reading the information recording object 30 at a viewing angle at which the image C2 of the transparent layer 32 can be seen by the reading device 5, the reading device 5 can read a code from data obtained by converting the image C2. Then, even when the information recording object 30 is read at a viewing angle at which the background image C1a, which is the pattern image of the lustrous layer 31, is visible, since the background image C1a of the lustrous layer 31 and the image C2 that is the pattern image of the transparent layer 32 have different code systems, the data obtained by the converting process is not disturbed by the data from the background image C1a of the lustrous layer 31. Therefore, even when the viewing angle is in a wide range, the information recording object 30 can be easily read, and the authenticity can be easily determined.

While an embodiment of the invention has been described above, the invention is not limited to the embodiment. The advantages described in the embodiment are only the most suitable advantages which can be obtained in the invention listed and the advantages of the invention are not limited to those described in the embodiment. In addition, the above-described embodiment and modifications to be described later may be used in combination as appropriate, and detailed description thereof will be omitted.

(Modifications)

(1) In the present embodiment, the information recording object 30 including the lustrous layer 31 made of a chromatic ink containing a lustrous material and the transparent layer 32 made of a transparent achromatic ink has been described as an example. However, the invention is not limited thereto. For example, the transparent layer 32 may not have an achromatic color and may have a chromatic color. However, since the transparent layer 32 is a pattern image and is preferably difficult to be seen, a light color is desirable when a chromatic color is used. In addition, even though an example in which a plurality of colors of ink is used to form the lustrous layer 31 has been described, a single color ink may be used.

(2) In the embodiment, the lustrous layer 31 and the transparent layer 32 have been described as having a square shape, but the invention is not limited thereto. The lustrous layer 31 and the transparent layer 32 may have another shape such as a rectangular shape, a circular shape, or an elliptical shape. In addition, the picture image of the lustrous layer 31 has been described as a star pattern, but other shapes and patterns such as a heart pattern and a triangle may be used.

(3) In the present embodiment, the lustrous layer 31 is described as an example including a background image and a picture image, but is not limited thereto. For example, the background image may be a border of the picture image. In addition, in the described example, the background image is a pattern image, and the picture image is not a pattern image. However, the invention is not limited thereto. However, when the picture image is set to a pattern image, the color of the picture image is impaired. Therefore, it is preferable that the picture image is not a pattern image. In addition, when the background image is not a pattern image, information cannot be included. Therefore, it is desirable that the background image is a pattern image so that information can be input. Note that, in order to read information from the pattern image that is the background image of the lustrous layer 31, the reading device 5 needs a conversion application different from the above-described conversion application.

(4) In the embodiment, a case in which the transparent layer 32 is directly formed on the lustrous layer 31 has been described as an example, but the invention is not limited thereto. For example, a substrate such as a transparent film may be provided between the lustrous layer 31 and the transparent layer 32. Moreover, for example, even if the transparent layer 32 is formed on the lustrous layer 31 described in the embodiment, the transparent layer 32 may further have a substrate such as a transparent film.

(5) In the present embodiment, an example is described in which, when the reading device 5 can specify a code obtained from the pattern image of the transparent layer 32, the reading device 5 determines that the code is authentic and performs processing based on the specified code. However, the invention is not limited thereto. Further, the specified code may be compared with the information printed on the card to determine the authenticity.

(6) In the present embodiment, the card 10 having the information recording object 30 has been described using an ID certificate as an example, but the invention is not limited thereto. For example, a card medium used in a game may be used. In addition, the invention is not limited to the card medium, and may correspond to a printed material such as a paper medium which has a monetary value and whose copied product has no monetary value such as a ticket or correspond to a label for security protection. Further, it is possible to adopt a printed product such as a passport.

(7) In the embodiment, the case of printing the pattern image has been described as an example, but the invention is not limited thereto. The pattern image may be formed by a method other than printing such as transfer or laser drawing.

(8) In the embodiment, the reading device has been described to be a mobile terminal as an example, but the invention is not limited thereto. For example, the reading device may be a personal computer. The reading unit may be a scanner or the like.

EXPLANATION OF REFERENCE NUMERALS

5 READING DEVICE
10 PRINTED MATTER
21 ILLUMINATION LIGHT SOURCE
23 CAMERA
30 INFORMATION RECORDING OBJECT
31 LUSTROUS LAYER
32 TRANSPARENT LAYER
50 CONTROL UNIT
60 STORAGE UNIT
61a CONTROL PROGRAM
61b CONVERSION APPLICATION
63 CODE TABLE
65 READING UNIT
C1, C2, Cy IMAGE
C1a BACKGROUND IMAGE
C1b STAR IMAGE

The invention claimed is:

1. An information recording object comprising
a superimposed image including a first ink layer and a second ink layer formed on the first ink layer,
wherein the first ink layer is an image of a chromatic color formed using a lustrous material,
the second ink layer is a pattern image which is formed using a transparent material and has regularity,
the first ink layer includes a shading pattern image from which information is allowed to be obtained by reading a color density difference, and the shading pattern image is an image having a code system different from a code system of the pattern image of the second ink layer,
the transparent material is configured so that an amount of reflected light varies depending on a viewing angle, and
the superimposed image is formed so that the second ink layer is allowed to be recognized by a specific viewing angle.

2. The information recording object according to claim 1, wherein the first ink layer includes a picture image and a background image,
the background image is the shading pattern image, and
the picture image is not the shading pattern image.

3. The information recording object according to claim 1, wherein the first ink layer is formed by a plurality of colors, and at least one color is formed using the lustrous material.

4. The information recording object according to claim 1, wherein each of the plurality of colors formed by the lustrous material is different in material and content of the lustrous material.

5. The information recording object according to claim 1, wherein the second ink layer is read by a reading unit of an external device and subjected to a converting process corresponding to the regularity, so that data corresponding to a code is generated.

6. A medium comprising
the information recording object according to claim 1.

7. A printed product comprising
the information recording object according to claim 1.

8. A medium comprising
a plurality of the information recording objects according to claim 5 disposed at different positions,
wherein the first ink layer of each of at least two of the information recording objects includes a picture image and a background image, and
the at least two of the information recording objects are different in the picture image, and the data obtained from one of the information recording objects is equal to the data obtained from another information recording object excluding the one information recording object.

9. A printed product comprising
a plurality of the information recording objects according to claim 5 disposed at different positions,
wherein the first ink layer of each of at least two of the information recording objects includes a picture image and a background image, and
the at least two of the information recording objects are different in the picture image, and the data obtained from one of the information recording objects is equal to the data obtained from another information recording object excluding the one information recording object.

10. The information recording object according to claim 2, wherein the first ink layer is formed by a plurality of colors, and at least one color is formed using the lustrous material.

11. The information recording object according to claim 2, wherein the second ink layer is formed except for an unprinted area corresponding to an area overlapping the picture image.

* * * * *